United States Patent [19]

Knutsen et al.

[11] Patent Number: 4,759,601
[45] Date of Patent: Jul. 26, 1988

[54] FIBER OPTIC CONNECTOR ASSEMBLY

[75] Inventors: Gary F. Knutsen, Houston; Daniel L. Mei, Sugar Land, both of Tex.

[73] Assignee: Schlumberger Technology Corporation, Houston, Tex.

[21] Appl. No.: 748,257

[22] Filed: Jun. 24, 1985

[51] Int. Cl.⁴ .................................................. G02B 6/38
[52] U.S. Cl. ............................ 350/96.21; 350/96.18; 350/96.20
[58] Field of Search ................ 350/96.18, 96.20, 96.21, 350/96.22; 367/25, 35

[56] References Cited

U.S. PATENT DOCUMENTS

| | | | |
|---|---|---|---|
| 3,825,320 | 7/1974 | Redfern | 350/96.22 |
| 3,914,015 | 10/1975 | McCartney | 350/96.22 |
| 3,963,323 | 6/1976 | Arnold | 350/96.22 |
| 4,204,743 | 5/1980 | Etaix | 350/96.2 |
| 4,222,629 | 9/1980 | Dassele et al. | 350/96.20 |
| 4,265,511 | 5/1981 | Nicia et al. | 350/96.18 |
| 4,398,791 | 8/1983 | Dorsey | 350/96.2 X |
| 4,440,469 | 4/1984 | Schumacher | 350/96.2 |
| 4,666,242 | 5/1987 | Cairns | 350/96.21 |

OTHER PUBLICATIONS

"Optoelectronics Designer's Catalog-1983-Components and Subsystems", HFBR-3000 Fiber Connector Assembly.
"International Wire & Cable Symposium Proceedings 1981", Ball Lens Connector System for Optical Fibers and Cables; Nicia and Rittich, pp. 341-351.

Primary Examiner—John Lee
Assistant Examiner—John Ngo
Attorney, Agent, or Firm—Henry N. Garrana

[57] ABSTRACT

A connector assembly for mechanically and optically associating a first optical fiber, exposed to high pressure and/or temperature fluids, with a second optical fiber, disposed within a body having low pressure conditions therein, has a hermetically sealed rigid transparent window and at least one lens disposed between the two optical fibers.

15 Claims, 2 Drawing Sheets

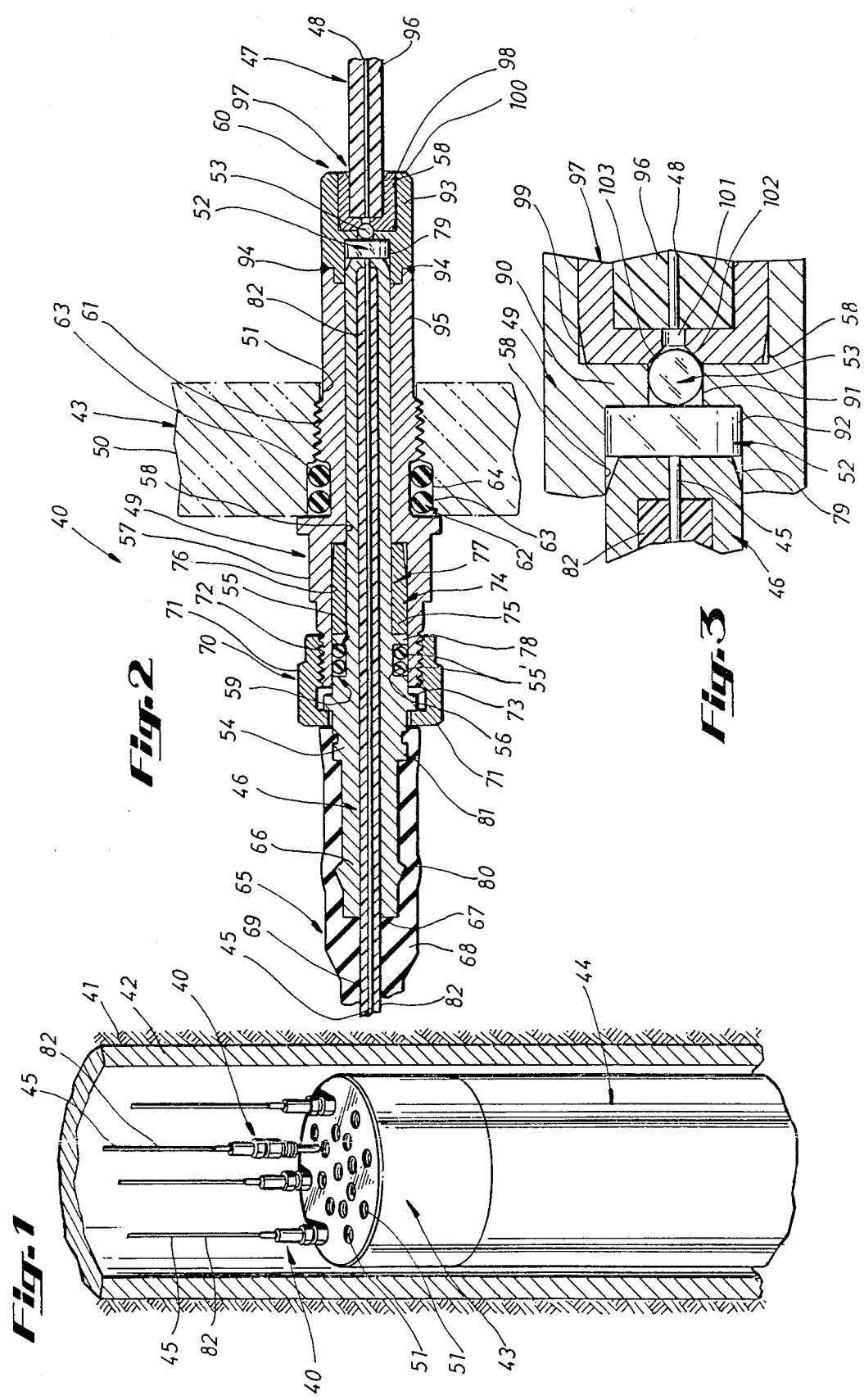

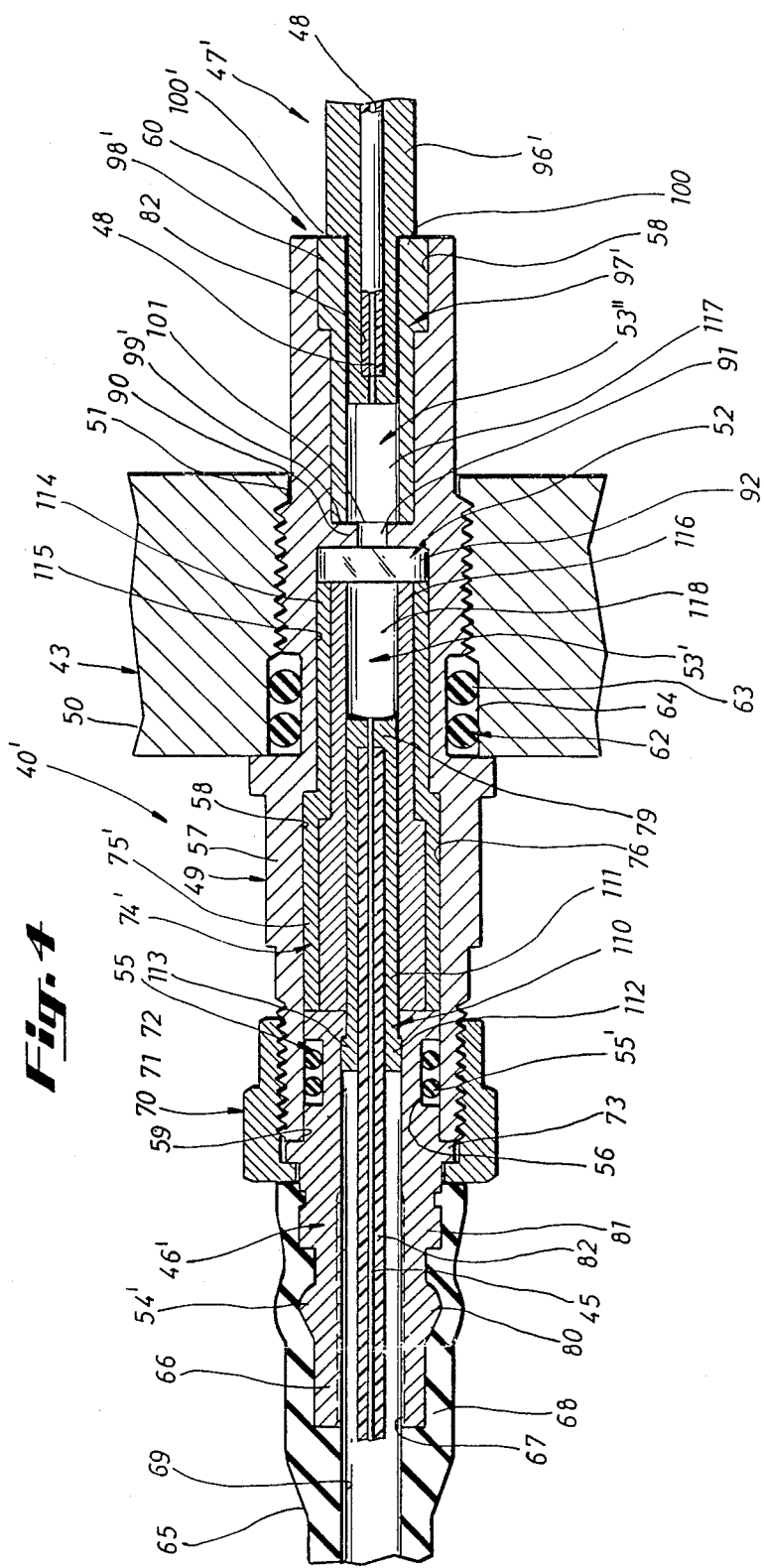

FIBER OPTIC CONNECTOR ASSEMBLY

FIELD OF THE INVENTION

The invention relates to a fiber optic connector assembly for mechanically and optically associating two optical fibers, particularly for use with well-logging instrumentation exposed to high pressure and/or temperature fluids in a borehole.

DESCRIPTION OF THE PRIOR ART

Well-logging instrumentation, used to determine various physical parameters of formations adjacent a borehole, require the transmission of various types of signals, typically either electrical or optical signals, from the well-logging instruments, or tools, to the earth's surface. When optical fibers are utilized to transmit the optical signals from the well-logging tool to equipment located at the earth's surface, it is necessary to optically and mechanically connect the optical fiber disposed within the well-logging tool with the optical fiber which passes from the well-logging tool, via a well-logging cable, to the instrumentation located at the earth's surface. Difficulties arise in achieving the desired mechanical and optical connection inasmuch as the optical fiber running from the well-logging tool to the earth's surface may be exposed to extremely high pressure and/or temperature fluids which may be present in the borehole. For example, the borehole may contain corrosive drilling fluids, or drilling muds, and/or salt water which can be at temperatures as high as 450° F. and/or pressures as high as 20,000 psi. The interior of the well-logging tool, being a sealed unit, is maintained at atmospheric pressure and it is imperative that no high pressure and/or temperature fluids enter the interior of the well-logging tool so as to not damage the electronic components disposed therein. Accordingly, it is imperative that a connector assembly for mechanically and optically connecting the optical fiber disposed within the well-logging tool with the optical fiber disposed within the borehole provide a complete and total sealing therebetween, so that the high pressure and/or temperature fluids of the borehole do not enter the interior of the well-logging tool. It is also important that the connector assembly be readily demountable and allow quick and easy assembly and disassembly thereof with respect to the well-logging tool.

Optically, it is important to have a connector assembly which results in a low optical coupling loss, or signal transmission loss, at the point where the two optical fibers are optically connected. The necessary low optical transmission losses should be maintained over the entire spectral region utilized in the well-logging instrumentation.

Although various types of fiber optic connector assemblies have been previously proposed, none of these prior art optic connector assemblies can be utilized for mechanically and optically connecting an optical fiber, exposed to high pressure and/or temperature fluids, with another optical fiber disposed within a body, such as a well-logging tool, having relatively lower pressure conditions therein. Rather, such prior art fiber optic connector assemblies are typically designed for use under relatively normal pressure and temperature conditions.

Accordingly, prior to the development of the present fiber optic connector assembly, there has been no fiber optic connector assembly for mechanically and optically connecting an optical fiber, exposed to high pressure and/or temperature fluids, with a second optical fiber, disposed within a body having low pressure conditions, which: maintains low loss optical couplings, provides complete sealing, or hermetic construction, to prevent the high pressure and/or temperature fluids from entering the well-logging tool; and is fully demountable to allow repeated assembly and disassembly of the fiber optic connector assembly. Therefore, the art has sought a fiber optic connector assembly for optically and mechanically associating an optical fiber, exposed to high pressure and/or temperature fluids, with another optical fiber, disposed within a body having low pressure conditions therein which: maintains low loss optical couplings, provides for hermetic construction to prevent the passage of high pressure and/or temperature fluids from entering the body; and is fully demountable so that the connector assembly may be repeatedly connected and disconnected as necessary.

SUMMARY OF THE INVENTION

In accordance with the invention the foregoing advantages have been achieved through the present connector assembly for mechanically and optically associating a first optical fiber, exposed to high pressure and/or temperature fluids, with a second optical fiber, disposed within a body having low pressure conditions therein. The present invention includes: a high pressure connector member having the first optical fiber associated therewith; a low pressure connector member having the second optical fiber associated therewith; a housing, associated with the high and low pressure connector members, and adapted to be sealingly disposed with respect to the body; at least one transparent bulkhead sealingly disposed within the housing and associated with the first optical fiber and disposed between the first and second optical fibers; and at least one lens associated with the second optical fiber and disposed between the second optical fiber and the at least one transparent bulkhead, whereby the first and second optical fibers are in a light transmitting relationship with one another and high pressure and/or temperature fluids are prevented from passing through the housing and the at least one transparent bulkhead into contact with the at least one lens and the second optical fiber.

A further feature of the present invention is that the at least one transparent bulkhead may be a rigid window hermetically sealed within the housing and is disposed between the first optical fiber and the at least one lens. Another feature of the present invention is that the high pressure connector member may be an elongate, generally tubular member having the first optical fiber disposed therein and extending along the length of the tubular member; and a portion of the high pressure connector member may have a sealing means associated therewith whereby the high pressure connector member is sealingly received within the housing in a nonfluid transmitting relationship with respect to the housing.

An additional feature of the present invention is that the housing may be an elongate, generally tubular member, having a passageway extending throughout the length of the tubular member and having first and second ends; the first end adapted to receive the high pressure connector member and the second end adapted to receive the low pressure connector member; and the at least one transparent bulkhead is sealingly disposed proximate the second end of the housing. A further feature of the present invention is that the housing may have an interior annular flange member disposed proximate the second end of the housing, the flange member having an opening extending therethrough; the at least one transparent bulkhead is a rigid transparent window, hermetically sealed with respect to the annular flange member and the housing passageway; and the at least one transparent bulkhead may be disposed between the interior annular flange member and the first optical fiber.

Another feature of the present invention is that the housing may include an abutment member disposed within the housing which abuts the high pressure connector member to align the high pressure connector member within the housing and to prevent the high pressure connector member from contacting and damaging the at least one transparent bulkhead. Another feature of the present invention is that the housing may have an interior annular flange member; the at least one transparent bulkhead may sealingly abut the annular flange; and the at least one transparent bulkhead is disposed between the high pressure connector member and the interior annular flange member. Additional features of the present invention are that the at least one lens may be either a ball lens or a rod-shaped cylindrical lens.

The connector assembly of the present invention, when compared with previously proposed prior art connector assemblies, has the advantages of: providing low loss optical couplings, providing a hermetic construction whereby the transmission of high pressure and/or temperature fluids into a well-logging tool is prevented; is fully demountable; and allowing repeated connection and disconnection of the optical fibers.

BRIEF DESCRIPTION OF THE DRAWINGS

FIG. 1 is a partial cross-sectional view along the longitudinal axis of a borehole disposed in the earth's surface, and illustrates a well-logging tool with a connector assembly in accordance with the present invention;

FIG. 2 is a cross-sectional view taken along the longitudinal axis of a connector assembly in accordance with the present invention;

FIG. 3 is an exploded cross-sectional view of a portion of a connector assembly in accordance with the present invention; and FIG. 4 is a cross-sectional view taken along the longitudinal axis of another embodiment of a connector assembly in accordance with the present invention.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In FIG. 1, a plurality of fiber optic connector assemblies 40, in accordance with the present invention, are shown being utilized within a borehole 41 which has been drilled into the earth's surface in a conventional manner. As shown in FIG. 1, borehole 41 may have a conventional casing 42 disposed therein. Connector assemblies 40, as will be hereinafter described in greater detail, are inserted within a conventional well-logging head 43 of a conventional well-logging tool 44. The fluid, not shown, contained within either borehole 41 or well casing 42, which fluid could be a corrosive drilling fluid, or drilling mud, or salt water, can be present in the borehole 41 at a temperature as high as 450° F. and at a pressure as high as 20,000 psi. Provided any openings in well-logging head 43 are completely sealed, the electronic instrumentation (not shown) within well-logging tool 44 is maintained at atmospheric pressure to protect the electronic instrumentation (not shown) within well-logging tool 44. Included within well-logging tool 44 are optical fibers which form a signal transmission link from the instrumentation within well-logging tool, which optical signals must pass through well-logging head 43 and then via connector assembly 40 to the optical fibers 45 which are exposed to the high pressure and/or temperature fluids (not shown) within the borehole or casing 41, 42.

With reference to FIG. 2, a connector assembly 40, in accordance with the present invention, will be described in greater detail. Connector assembly 40, in accordance with the present invention, is shown to generally comprise a high pressure connector member 46 having a first optical fiber, or the optical fiber 45, which is exposed to the high pressure and/or temperature fluids, associated with the high pressure connector member 46; a low pressure connector member 47, having a second optical fiber 48 associated therewith; a housing 49, associated with the high and low pressure connector members 46, 47. The housing 49, as will be hereinafter described in greater detail, is adapted to be sealingly disposed with respect to a body 50 having low pressure conditions therein. Body 50 may comprise a conventional well-logging head 43, as previously described, and well-logging head 43 may have one or more openings 51 therein (FIGS. 1 and 2) which openings 51 provide access through well-logging head 43 to the interior of the well-logging tool 44. The connector assembly 40 further generally comprises at least one transparent bulkhead 52, sealingly disposed within the housing 49 and associated with the first optical fiber 45. Bulkhead 52 is disposed between the first and second optical fibers 45, 48. At least one ball lens 53 is associated with the second optical fiber 48 and is disposed between the second optical fiber 48 and the at least one transparent bulkhead 52, whereby the first and second optical fibers 45, 48 are in a light transmitting relationship with one another and high pressure and/or temperature fluids are prevented from passing through the housing 49 and the at least one transparent bulkhead 52 into contact with the at least one ball lens 53 and the second optical fiber 48.

Still with reference to FIG. 2, it is seen that the high pressure connector member 46 may be an elongate, generally tubular member 54 having the first optical fiber 45 disposed therein and extending along the length of the tubular member 54. A portion of the high pressure connector member 46 has a sealing means 55 associated therewith, whereby the high pressure connector member 46 is sealingly received within the housing 49 in a non-fluid transmitting relationship with respect to the housing 49. Sealing means 55 may be an elastomeric O-ring seal, or any other type of suitable seal; and preferably two O-ring seals 55' are disposed within an outer annular groove 56 formed in the outer surface of high pressure connector member 46. As seen in FIG. 2, O-rings 55' engage in a sealing manner with an interior surface of housing 49.

Still with reference to FIG. 2, it is seen that housing 49 may be an elongate, generally tubular member 57 having a passageway 58 extending throughout the length of the tubular member 57 and having first and second ends 59, 60. As will be hereinafter described in greater detail, the first end 59 is adapted to receive the high pressure connector member 46 and the second end 60 is adapted to receive the low pressure connector member 47. Preferably, the at least one transparent bulkhead 52 is sealingly disposed, as will be hereinafter described in greater detail, proximate the second end 60 of the housing 49. Housing 49 may be adapted to be releaseably and sealingly disposed with respect to the body 50, or well-logging head 43, in any suitable fashion; however, housing 49 is preferably threadably disposed within well-logging head 43, as by mating threads 61 formed on housing 49 and within opening 51 of well-logging head 43. Additionally, a sealing means 62, or O-rings 63, may be provided between body 50 and housing 49, as by disposing O-rings 63 within an outer annular groove 64, formed in the outer surface of housing 49. Of course, any other suitable sealing means 62, other than O-rings 63 could be utilized, such as mating, water-tight screw threads, which insure that housing 49 is sealingly disposed with respect to the body 50, or well-logging head 43.

Still with reference to FIG. 2, it is seen that a seal means 65 may be disposed about a portion 66 of the high pressure connector member 46 which extends outwardly from the housing 49. Seal means 65 may also be disposed about a portion of the first optical fiber 45, whereby high pressure and/or temperature fluids are prevented from passing into the high pressure connector member 46 at the point, or opening 67, where the first optical fiber 45 enters the high pressure connector member 46. Preferably, seal means 65 comprises a generally tubular shaped elastic member 68 which tightly conforms to an exterior surface of the portion 66 of the high pressure connector member 46 which extends outwardly from the housing 49, and which elastic member also tightly conforms to an exterior surface portion 69 of the first optical fiber 45 which extends outwardly from the high pressure connector member 46. Seal means 65 could be manufactured of any suitable elastomeric material having the requisite sealing characteristics, as well as the necessary strength and durability characteristics to withstand exposure to the high pressure and/or temperature fluids to which it is exposed. Likewise, housing 49 and the high pressure connector member 46 may be manufactured of any suitable metallic material having the requisite strength and durability characteristics to withstand the high pressure and temperature conditions encountered in a borehole 41.

Still with reference to FIG. 2, housing 49 may include means for releasably securing 70 the high pressure connector member 46 within the housing 49, the releasable securing means 70 containing the high pressure connector member 46 to compress it within the housing 49. Preferably, the releasable securing means 70 may comprise a threaded nut 71 which is engageable with the housing 49, as by mating threads 72, and is also engageable with the high pressure connector member 46, as by nut 71 engaging an annular rib 73 formed on the outer surface of high pressure connector member 46. Housing 49 may include an abutment member 74 disposed within the housing 49 which abuts the high pressure connector member 46 to align the high pressure connector member 46 within the housing 49 and to prevent the high pressure connector member 46 from contacting and damaging the at least one transparent bulkhead 53. Preferably, abutment member 74 is a tubular insert 75 which is disposed within an enlarged diameter portion 76 of passageway 58 proximate the first end 59 of housing 49. Tubular insert 75 is preferably press-fitted within the enlarged diameter portion 76 of passageway 58, and its outer surface closely conforms to the interior of enlarged diameter portion 76 of passageway 58. Preferably, the interior surface of tubular insert 75 closely conforms to the outer circumferential surface of high pressure connector member 46 as shown at 77.

Accordingly, as will be hereinafter described in greater detail, when the connector assembly 40 of the present invention is assembled, the high pressure connector member 46 is inserted within housing 49, and threaded nut 71 is tightened with respect to housing 49, and engages against annular rib 73 of the high pressure connector member 46. As nut 71 is continued to be threaded upon housing 49, to compress high pressure connector member 46 into housing 49, an annular rib 78, forming a part of the annular groove 56 of high pressure connector member 46, will abut against tubular insert 75. This abutting relationship will prevent further inward movement of high pressure connector member 46 into housing 49. As will be hereinafter described in greater detail, this abutting relationship between tubular insert 75 and outer annular rib 78 prevents undersired movement of the end 79 of high pressure connector member 46 from contacting and damaging the at least one transparent bulkhead 52. It should be noted that after nut 71 has been releaseably secured, as previously described, with respect to housing 49, sealing means 65 is placed over the first optical fiber 45 and passed over portion 66 of the high pressure connector member 46 as previously described. In this regard, portion 66 of high pressure connector member 46 may be provided with two exterior annular ridge members 80, 81 which engage the interior surface of sealing means 65 to insure against accidental movement of seal means 65 from its sealing position shown in FIG. 2. AS shown in FIGS. 1 and 2, the first optical fiber 45 is preferably provided with an outer annular jacket 82 which serves to protect the first optical fiber from damage due to exposure to the high pressure and/or temperature fluids which are present in the borehole.

With reference now to FIGS. 2 and 3, it is seen that housing 49 is provided with an interior annular flange member 90 disposed proximate the second end 60 of housing 49. Interior annular flange member 90 has an opening 91 extending therethrough and the at least one transparent bulkhead 52 is hermetically sealed with respect to the annular flange member 90 and the housing passageway 58. As seen in FIG. 3, the at least one transparent bulkhead 52 is disposed between the interior annular flange member 90 and the first optical fiber 45. It should be noted, as seen in FIGS. 2 and 3, that the jacketing material 82 associated with first optical fiber 45 may end proximate end 79 of high pressure connector member 46, whereby an unjacketed portion of first optical fiber 45 extends to the end 79 of high pressure connector member 46. The at least one transparent bulkhead 52 sealingly abuts against interior annular flange member 90 and passageway 58 of housing 49.

With reference to FIG. 3, the at least one transparent bulkhead 52 may preferably be a rigid transparent window 92 having the requisite strength characteristics to withstand the high temperature and pressure fluid conditions found in the borehole. In this regard, should seal means 65 and 55 fail, it is necessary that the at least one bulkhead 52 be able to withstand the high pressure and/or temperature fluids which could enter passageway 58 and which would seek to enter into the interior of the body 50, or well-logging head 43 and related well-logging tool 44. Accordingly, window 92 is a rigid sapphire, quartz or glass window which has the necessary optical qualities and also possesses the requisite strength characteristics, including the ability to withstand high temperature and/or pressure fluid conditions. Preferably, window 92 is made of sapphire when very high temperature and/or pressure fluid conditions are to be encountered. Window 92 is preferably hermetically sealed within the housing 49 and is disposed between the first optical fiber 45 and the at least one ball lens 53, as by sealing window 92 with respect to passageway 58 and interior annular flange member 90 with a high pressure and temperature resistant epoxy material. Alternatively, window 92 may be hermetically sealed by utilizing a material that is sold under the trademark of KOVAR, which is either applied as a paste or vacuum deposited, and then heated to provide the requisite hermetic seal. With reference to FIG. 2, it is seen that for ease of manufacturing purposes, the second end 60 of housing 49 may comprise a separate end portion 93 which is preferably welded, as at 94, to the other portion 95 of housing 49. Alternatively, end portion 93 could be press-fitted into portion 95 of housing 49, or alternatively, threadedly received into portion 95 of housing 49.

With reference to FIGS. 2 and 3, the at least one ball lens 53 is disposed proximate the opening 91 in the interior annular flange member 90 and between the at least one transparent bulkhead 52 and the second optical fiber 48 in a light transmitting relationship with respect to the first and second optical fibers 45, 48. Low pressure connector member 47 may comprise a generally elongate tubular member 96 having the second optical fiber 48 disposed therein. Low pressure connector member 47 may be merely inserted into the passageway 58 at the second end 60 of housing 49; however, low pressure connector member 47 preferably has a lens spacer member 97 associated therewith. Lens spacer member 97 is disposed between the at least one ball lens 53 and the second optical fiber 48; and lens spacer member 97 and low pressure connector member 47 are received in the passageway 58 at the second end 60 of housing 49.

Still with reference to FIGS. 2 and 3, it is seen that lens spacer member 97 may be a generally tubular cup-shaped member 98 having first and second ends 99, 100; the first end 99 having an opening 101 therein and the second end 100 thereof receiving the low pressure connector member 47 having the second optical fiber 48 disposed therein. The opening 101, formed in the first end 99 of the lens spacer member 97 is disposed in axial alignment with the second optical fiber 48 and the at least one ball lens 53. As seen in FIG. 3, the first end 99 of the lens spacer member 97 may also include an alignment surface 102, as formed by a tapered countersunk opening 103, which alignment surface 102 engages the at least one ball lens 53 to align the ball lens 53 with the opening 101 in the first end 99 of the lens spacer member 97, which in turn forces the ball lens 53 to slightly contact the transparent bulkhead 52. Lens spacer member 97 also serves to precisely space the second optical fiber 48 from the ball lens 53. Lens spacer member 97 could be formed in one or more pieces; however, it is preferably a single tubular cup-shaped member 98 which is press-fitted within passageway 58 at the second end 60 of housing 49. The second optical fiber 48 may be held in place within the low pressure connector member 47 as by a spring-loaded pin (not shown), or any other suitable means which insures that the second optical fiber 48 does not extend outwardly of the tubular member 96, so as to not contact the ball lens 53.

The connector assembly 40, in accordance with the present invention, is readily demountable from either side of body 50, or well-logging head 43, and may be easily assembled and disassembled as necessary. The connector assembly 40 first has the at least one transparent bulkhead 52 hermetically sealed within housing 49, and thereafter ball lens 53 is placed in opening 91 in the interior annular flange member 90. Ball lens 53 is then aligned by inserting the lens spacer member 97 into the passageway 58 at the second end 60 of housing 49, as previously described. Housing 49, including transparent bulkhead 52, ball lens 53, and lens spacer member 97 may then be sealingly disposed within body 50, or well-logging head 43, as previously described. Thereafter, the high pressure and low pressure connector members 46 and 47 are assembled previously described, including the placement of seal means 65 about high pressure connector member 46 and the first optical fiber 45.

Optic, or light, signals are transmitted between the first and second optical fibers 45, 48, in the following manner. A light, or optic signal, travelling down the first optical fiber 45 from signal generating equipment (not shown) disposed at the earth's surface travels through optical fiber 45, and is then transmitted through the transparent bulkhead 52. The light signal is then refocused by the ball lens member 53 into the second optical fiber 48, and hence to the electronic instrumentation (not shown) contained within the body 50, or well-logging head 43 and well-logging tool 44. Likewise, optic, or light, signals originating from a signal generator within body 50, or electronic instrumentation contained within well-logging head 43 and well-logging tool 44, travel through the second optical fiber 48 and into ball lens 53, which in turn refocuses the light signals and transmits them through transparent bulkhead 52 into the first optical fiber 45.

With reference now to FIG. 4, another embodiment of a connector assembly 40', in accordance with the present invention will be described. Elements of connector assembly 40' bear the same reference numerals as the elements of the embodiment of connector assembly 40 described in connection with FIGS. 2 and 3, when such elements are the same, or substantially the same, as those previously described, and description of such elements will not be repeated hereinafter. Elements of connector assembly 40' differing from corresponding elements of connector assembly 40 have been numbered the same, but such reference numerals carry a prime (') designation. In this regard, high pressure and low pressure connector members 46' and 47' of FIG. 4 differ from those previously described, but operate in substantially the same manner.

With reference to FIG. 4, it is seen that high pressure connector member 46' is an elongate, generally tubular member 54' having the first optical fiber 45 disposed therein and extending along the length of the tubular member 54'. Additionally, as seen in FIG. 4, a portion of the first optical fiber 45 passes outwardly from tubular member 54' and into an auxiliary high pressure connector member 110. Auxiliary high pressure connector member 110 may be a generally elongate, tubular member 111 which receives the first optical fiber 45, having jacket 82 thereon. Member 111 may include an enlarged end portion 112 which is received within tubular member 54', and abuts against an inwardly extending ridge 113 formed in an end of tubular member 54'. High pressure connector member 46' is sealingly received within housing 49 in the same manner that high pressure connector member 46 is received within housing 49 via releasable securing means 70 as previously described.

Housing 49 may also include an abutment member 74' disposed within the housing 49 which abuts the high pressure connector member 46' to align the high pressure connector member 46' within the housing 49. Preferably, abutment member 74' is a tubular insert 75' which is disposed within an enlarged diameter portion 76 of passageway 58 proximate the first end 59 of housing 49. Tubular insert 75' may also include an elongate extension portion 114 which is disposed within a reduced diameter portion 115 of passageway 58 in housing 49, as shown in FIG. 4. Additionally, an auxiliary tubular, guide sleeve 116 may be disposed in a mating relationship with abutment member 74'; and auxiliary guide sleeve 116 receives auxiliary high pressure connector member 110 and one of the at least one lens 53', which lens 53' will be hereinafter described in greater detail. Tubular insert 75', along with auxiliary guide sleeve 116 may be preferably press-fitted within passageway 58, and the interior surface of auxiliary guide sleeve 116 closely conforms to the outer circumferential surface of auxiliary high pressure connector member 110.

Low pressure connector member 47' may comprise a generally elongate tubular member 96' having the second optical fiber 48 disposed therein, along with another at least one lens 53", which lens will be hereinafter described in greater detail. Low pressure connector member 47' may be merely inserted into the passageway 58 at the second end 60 of housing 49; however, low pressure connector member 47' preferably has a lens spacer member 97' associated therewith. Lens spacer member 97' is disposed within the second end 60 of housing 49 in a closely conforming relationship with housing 49, and lens spacer member 97' receives lens 53" and tubular member 96' of the low pressure connector member 47' therein. Lens spacer member 97' may be a generally tubular member 98' having first and second ends 99', 100'; the first end 99' receiving lens 53" therein, and the second end 100' thereof receiving the low pressure connector member 47', or tubular member 96' therein. Thus, as seen in FIG. 4, the second optical fiber 48 is disposed in axial alignment in a light transmitting relationship with the lens 53", opening 91, transparent bulkhead 52, second lens 53', and the first optical fiber 45.

Rather than utilizing at least one ball lens 53 as described in connection with the embodiment of connector assembly 40 of FIGS. 2 and 3, the embodiment of connector assembly 40' of FIG. 4, utilizes at least one lens 53", or a cylindrical, rod-shaped lens 117, disposed within lens spacer member 97' proximate the second end 60 of housing 49. One example of a suitable cylindrical, rod-shaped lens 117 is a lens sold by NSG America, Inc., under the trademark SELFOC ®. Such lenses 117 may be either a collimating lens or a focusing lens. In the embodiment shown in FIG. 4, two cylindrical, rod-shaped lenses 117, 118 are utilized, lens 117 being disposed in connector assembly 40' as previously described and the other lens 118 being disposed within the auxiliary guide sleeve 116 within housing 49. As shown in FIG. 4, lens 118 is disposed between transparent bulkhead 52 and the first optical fiber 45. In the embodiment shown in FIG. 4, each lens 117 and 118 would be a collimating lens, whereby optic, or light, signals are transmitted between the first and second optical fibers 45, 48, in the following manner. Light, or optic, signals, travelling down the first optical fiber 45 from signal generating equipment (not shown) disposed at the earth's surface travel through optical fiber 45. The signals are then transmitted through the lens 118, whereby the light signals are collimated and made paralle, prior to passing through transparent bulkhead 52. The light, or optic, signals, then enter lens 117, and are recollimated, or refocused, by lens 117 into the second optical fiber 48, and enter the electronic instrumentation (not shown) contained within the body 50, or well-logging head 43 of well-logging tool 44. Likewise, optic, or light, signals originating from a signal generator within body 50, or electronic instrumentation contained within well-logging head 43 of well-logging tool 44, travel through the second optical fiber 48 and into lens 117, which in turn collimates the light signals and transmits them through transparent bulkhead 52, from which the light signals are recollimated, or refocused, by lens 118 into first optical fiber 45.

If only one cylindrical, rod-shaped lens 117, or 118 is desired to be utilized, such rod-shaped lens 117, or 118, would be of the focusing type, and could be disposed either adjacent the first or second optical fibers 45, 48. Preferably, if only one cylindrical, rod-shaped lens is utilized, it would be disposed in the manner in which lens 117 is shown disposed in FIG. 4, and it would be of the focusing type. Lens 118 could be dispensed with, and first optical fiber 45 would be disposed adjacent transparent bulkhead 52, as by extending auxiliary high pressure connector member 110, whereby it terminates in close proximity to transparent bulkhead 52. The operation of connector assembly 40' when only utilizing one cylindrical, rod-shaped lens 117 would be identical to that previously described in connection with connector assembly 40 of FIGS. 2 and 3. Alternatively, cylindrical, rod-shaped lens 117 could be dispensed with and a single cylindrical, rod-shaped lens 118, of the focusing type would be disposed as shown in FIG. 4 and the second optical fiber 48 would be disposed in close proximity to opening 91, as by extending low pressure connector member 47' to end 99' of lens spacer member 98'.

It is to be understood that the invention is not limited to the exact details of construction, operation, exact materials, or embodiment shown and described, as obvious modifications and equivalents will be apparent to one skilled in the art; for example, an additional transparent bulkhead and ball lens could be associated with the housing or the low pressure connector member to increase the optical coupling efficiency of the connector assembly. Accordingly, the invention is therefore to be limited only by the scope of the appended claims.

We claim:

1. A feedthrough connector for optically and mechanically intercoupling the opposed end portions of associated first and second optical fibers respectively located outside of and inside of an enclosed pressure-tight housing and comprising:

a tubular connector body having outward and inward end portions and an axial bore extending between said end portions having an enlarged-diameter bore portion in said outward end portion of said connector body providing a first outwardly-facing shoulder and a reduced-diameter bore portion in an intermediate portion of said connector body providing a second outwardly-facing shoulder;

means for providing a fluid-tight barrier in said axial bore including a window which is integrally formed of an optically-transparent rigid material of sufficient strength and thickness to withstand fluid pressures of a predetermined magnitude and is disposed in said reduced-diameter bore portion and supported by said second shoulder, and means hermetically sealing said window in said reduced-diameter bore portion for blocking fluid flow through said axial bore around said window;

first means for optically intercoupling and retaining an end portion of an optical fiber in said outward end portion of said connector body including an elongated sleeve for fitting around an optical fiber having a free end cooperatively arranged in said reduced-diameter bore portion in light-transmitting relationship with the outward face of said window, replaceable elastomeric sealing means in said axial bore for sealingly engaging adjacent surfaces of said connector body and said elongated sleeve to block fluid flow through said axial bore outside of said elongated sleeve, a replaceable elastomeric sleeve for sealingly enclosing adjacent surfaces of said elongated sleeve and an end portion of a first optical fiber in said outward end portion of said connector body to block fluid flow through said elongated sleeve, and means for releasably securing said elongated sleeve to said connector body;

means including a rigid spacer cooperatively arranged in said axial bore between said elongated sleeve and said first shoulder for preventing movement of said elongated sleeve against said window by inwardly-directed pressure forces acting on said outward end portion of said elongated sleeve; and second means for optically intercoupling and retaining an end portion of an optical fiber in said inward end portion of said connector body including a lens cooperatively arranged in said axial bore in light-transmitting relationship with the inward face of said window for transmitting light between said window and a second optical fiber having a free end cooperatively arranged in said axial bore in light-transmitting relationship with said lens.

2. The feedthrough connector of claim 1 wherein said lens is a ball lens; and said second means further include a tubular retaining member disposed in said axial bore in said inward end portion of said connector body having means on one end portion of said retaining member cooperatively arranged for coaxially positioning said ball lens in light-transmitting relationship with said inward face of window and means on the other end portion of said retaining member cooperatively arranged for coaxially positioning the free end of an optical fiber in light-transmitting relationship with said ball lens.

3. The feedthrough connector of claim 1 wherein said window is formed of a material selected from the group consisting of glass, quartz and sapphire.

4. The feedthrough connector of claim 1 wherein said lens is a rod lens.

5. The feedthrough connector of claim 1 wherein said lens is a rod lens; and said first means further include a second rod lens, and a tubular retaining member disposed in said reduced-diameter bore portion and having means on one end portion of said retaining member cooperatively arranged for coaxially positioning said second rod lens in light-transmitting relationship with said outward face of window and means on the other end portion of said retaining member cooperatively arranged for coaxially positioning the free end of an optical fiber within said enlarged-diameter bore portion in light-transmitting relationship with said second rod lens.

6. The feedthrough connector of claim 5 wherein both of said rod lens are collimating lenses.

7. The feedthrough connector of claim 5 wherein both of said rod lens are focusing lenses.

8. A feedthrough connector for optically and mechanically intercoupling the opposed end portions of associated first and second optical fibers respectively located outside of and inside of an enclosed pressure-tight housing and comprising:

a connector body with outward and inward end portions and having an axial bore extending through said connector body which includes an enlarged-diameter bore portion in said outward end portion of said connector body providing a first annular shoulder facing said outward end portion, a reduced-diameter bore portion in an intermediate portion of said connector body providing a second annular shoulder facing said outward end portion, and an enlarged-diameter bore portion in said inward end portion of said connector body providing a third annular shoulder facing said inward end portion of said connector body;

means for sealingly mounting said connector body in an enclosed housing including external threads around said connector body for threadedly engaging a complementally-threaded opening in an exterior wall of the enclosed housing, and an external groove arranged around said connector body between its said outward end portion and external threads to carry a replaceable elastomeric sealing member for sealingly engaging a wall of the enclosed housing carrying said connector body;

means providing a fluid-tight barrier in said axial bore and including a cylindrical window integrally formed of an optically-transparent rigid material of sufficient strength and thickness to withstand fluid pressures of a predetermined magnitude which is positioned in said reduced-diameter bore portion with the perimeter of the inward face of said window coaxially supported on said second shoulder, and means hermetically sealing said window within said reduced-diameter bore portion for blocking fluid flow through said axial bore around said window;

first means for optically intercoupling and retaining an end portion of an optical fiber in said outward end portion of said connector body including an elongated sleeve arranged in said axial bore for fitting around an optical fiber having a free end disposed in said reduced-diameter bore portion and positioned in light-tranmitting relationship with the outward face of said window, replaceable elastomeric sealing means in said axial bore sealingly engaging adjacent surfaces of said connector body and said elongated sleeve for blocking fluid flow though said axial bore outside of said elongated sleeve, a replaceable elastomeric sleeve sealingly enclosing adjacent surfaces of said elongated sleeve and an end portion of a first optical fiber in said outward end portion of said connector body for blocking fluid flow through said elongated sleeve, and means for releasably securing said elongated sleeve to said connector body;

means including a rigid spacer cooperatively arranged in said axial bore between said elongated sleeve and said first shoulder for preventing movement of the inward end portion of said elongated sleeve against the outer face of said window by inwardly-directed pressure forces acting on the outward end portion of said elongated sleeve; and second means for optically intercoupling and retaining an end portion of an optical fiber in said inward end portion of said connector body including a retainer sleeve for fitting around an optical fiber having a free end cooperatively arranged in said enlarged-diameter bore portion in said inward end portion of said connector body, a lens cooperatively arranged in the inward end portion of said retainer sleeve in light-transmitting relationship with the inward face of said window for transmitting light between said window and a second optical fiber having a free end cooperatively arranged in said retainer sleeve in light-transmitting relationship with said lens.

9. The feedthrough connector of claim 8 wherein said window is formed of a material selected from the group consisting of glass, quartz and sapphire.

10. The feedthrough connector of claim 8 wherein said lens is a ball lens.

11. The feedthrough connector of claim 10 wherein said window is formed of a material selected from the group consisting of glass, quartz and sapphire.

12. The feedthrough connector of claim 8 wherein said lens is a rod lens; and said first means further include a second retainer sleeve for fitting around an optical fiber having a free end cooperatively arranged in said enlarged-diameter bore portion in said outward end portion of said connector body, a second rod lens cooperatively arranged in the inward end portion of said second retainer sleeve in light-transmitting relationship with the outward face of said window for transmitting light between said outward face of said window and a first optical fiber having a free end cooperatively arranged in said second retainer sleeve in light-transmitting relationship with said second rod lens.

13. The feedthrough connector of claim 11 wherein said window is formed of a material selected from the group consisting of glass, quartz and sapphire.

14. The feedthrough connector of claim 8 wherein both of said rod lenses are collimating lenses.

15. The feedthrough connector of claim 8 wherein both of said rod lenses are focusing lenses.

* * * * *